United States Patent
Tsuchiya et al.

(10) Patent No.: US 8,812,803 B2
(45) Date of Patent: Aug. 19, 2014

(54) DUPLICATION ELIMINATION IN A STORAGE SERVICE

(71) Applicant: Fujitsu Limited, Kawasaki (JP)

(72) Inventors: Yoshihiro Tsuchiya, Yokohama (JP);
Takashi Watanabe, Kawasaki (JP);
Yasuo Noguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 145 days.

(21) Appl. No.: 13/680,444

(22) Filed: Nov. 19, 2012

(65) Prior Publication Data

US 2013/0198471 A1    Aug. 1, 2013

(30) Foreign Application Priority Data

Jan. 30, 2012  (JP) .................................. 2012-17032

(51) Int. Cl.
*G06F 12/16* (2006.01)
*G06F 17/30* (2006.01)

(52) U.S. Cl.
CPC .......... *G06F 12/16* (2013.01); *G06F 17/30156* (2013.01)
USPC ......................................... 711/162; 711/161

(58) Field of Classification Search
CPC ..... G06F 11/1456; G06F 3/065; G06F 3/067; G06F 12/16; G06F 17/30156
USPC .................................................. 711/161, 162
See application file for complete search history.

(56) References Cited

U.S. PATENT DOCUMENTS

| | | | | |
|---|---|---|---|---|
| 7,685,360 | B1* | 3/2010 | Brunnett et al. | 711/112 |
| 7,752,491 | B1* | 7/2010 | Liikanen et al. | 714/6.13 |
| 8,285,690 | B2* | 10/2012 | Nakamura et al. | 707/692 |
| 2009/0083344 | A1 | 3/2009 | Inoue et al. | |
| 2011/0138144 | A1 | 6/2011 | Tamura et al. | |
| 2012/0102280 | A1* | 4/2012 | Nasu et al. | 711/162 |
| 2013/0110793 | A1* | 5/2013 | Chavda et al. | 707/692 |

FOREIGN PATENT DOCUMENTS

| | | |
|---|---|---|
| JP | 2009-80671 | 4/2009 |
| JP | 2011-118712 | 6/2011 |

\* cited by examiner

*Primary Examiner* — Than Nguyen
(74) *Attorney, Agent, or Firm* — Fujitsu Patent Center

(57) ABSTRACT

A method of managing storage implemented in a storage management device that manages storage to which access for information is made by a requesting processing apparatus, including randomly obtaining a prescribed number of data units from among data units that constitute the information from the storage, calculating a sample unit duplication ratio, which is a ratio at which the obtained data units duplicate each other, estimating an overall data unit duplication ratio, which is a ratio at which all data units stored in the storage duplicate each other, by using a prescribed function that utilizes the calculated sample unit duplication ratio, and outputting the estimated overall data unit duplication ratio to an output device.

4 Claims, 11 Drawing Sheets

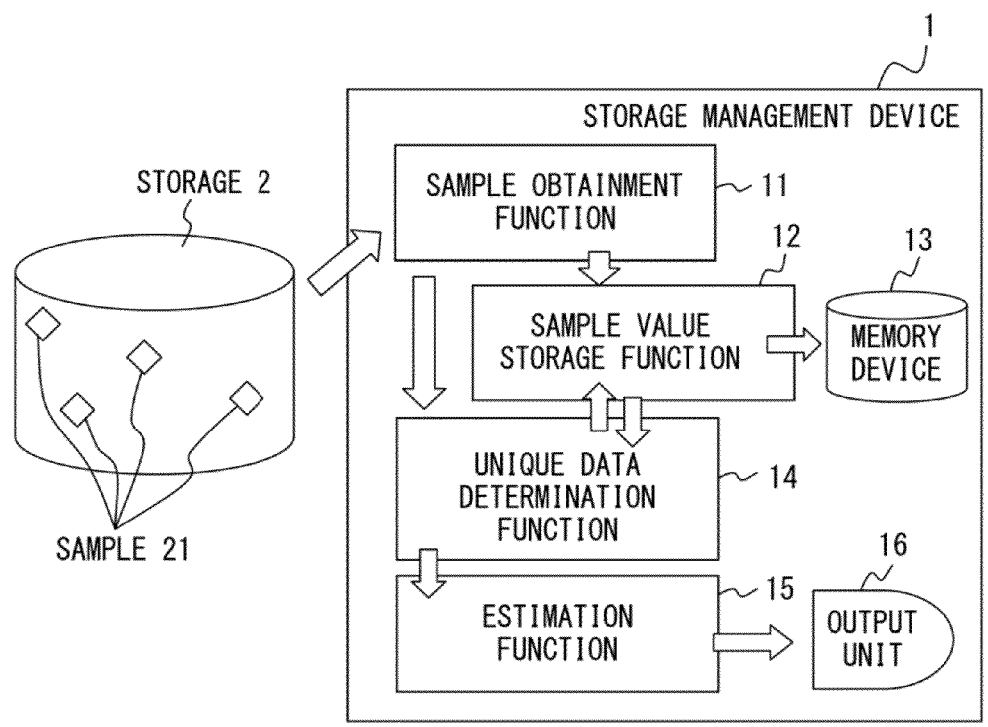
F I G. 1

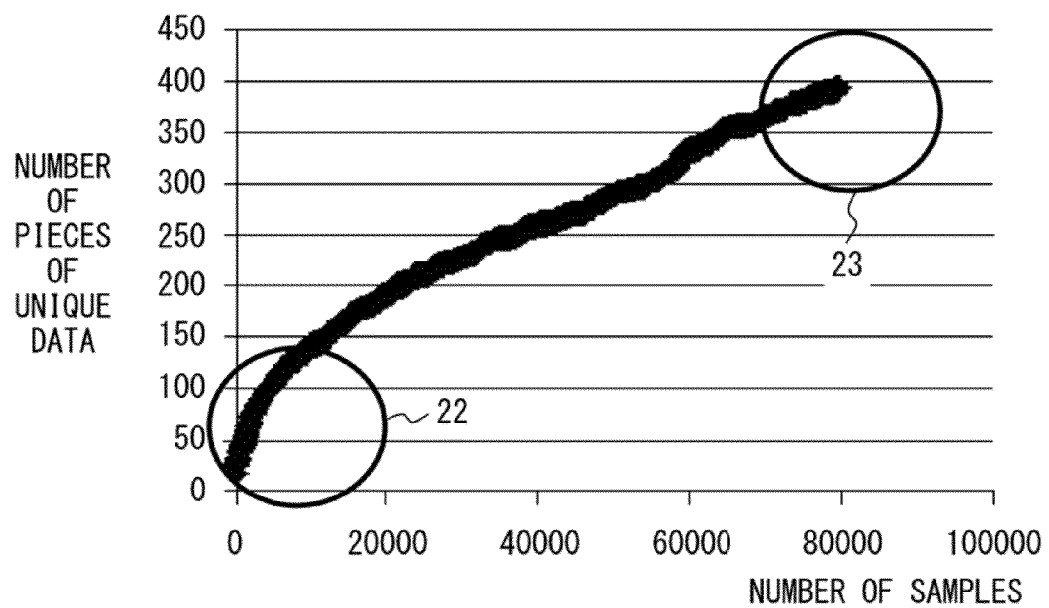
F I G. 2

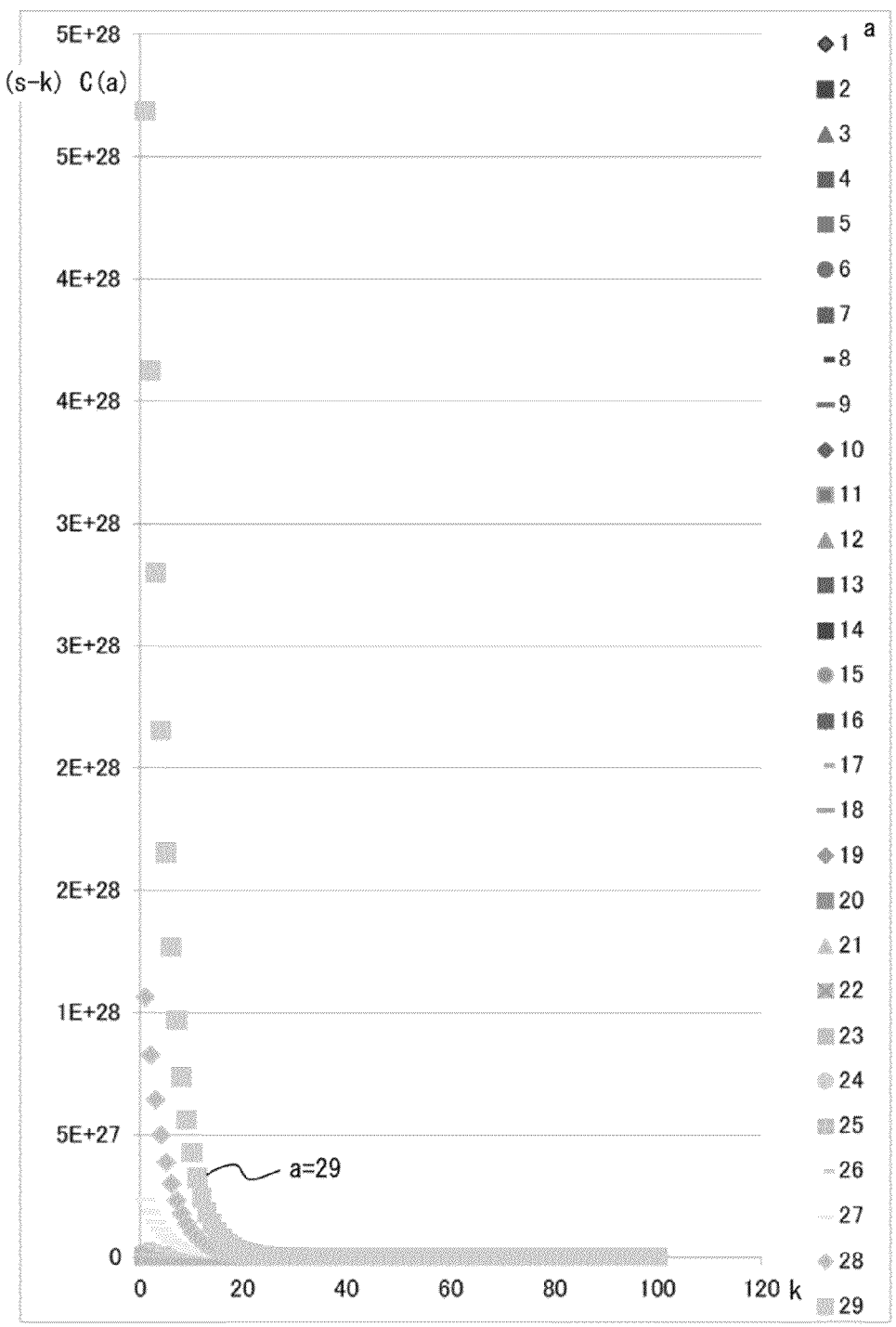
F I G. 3

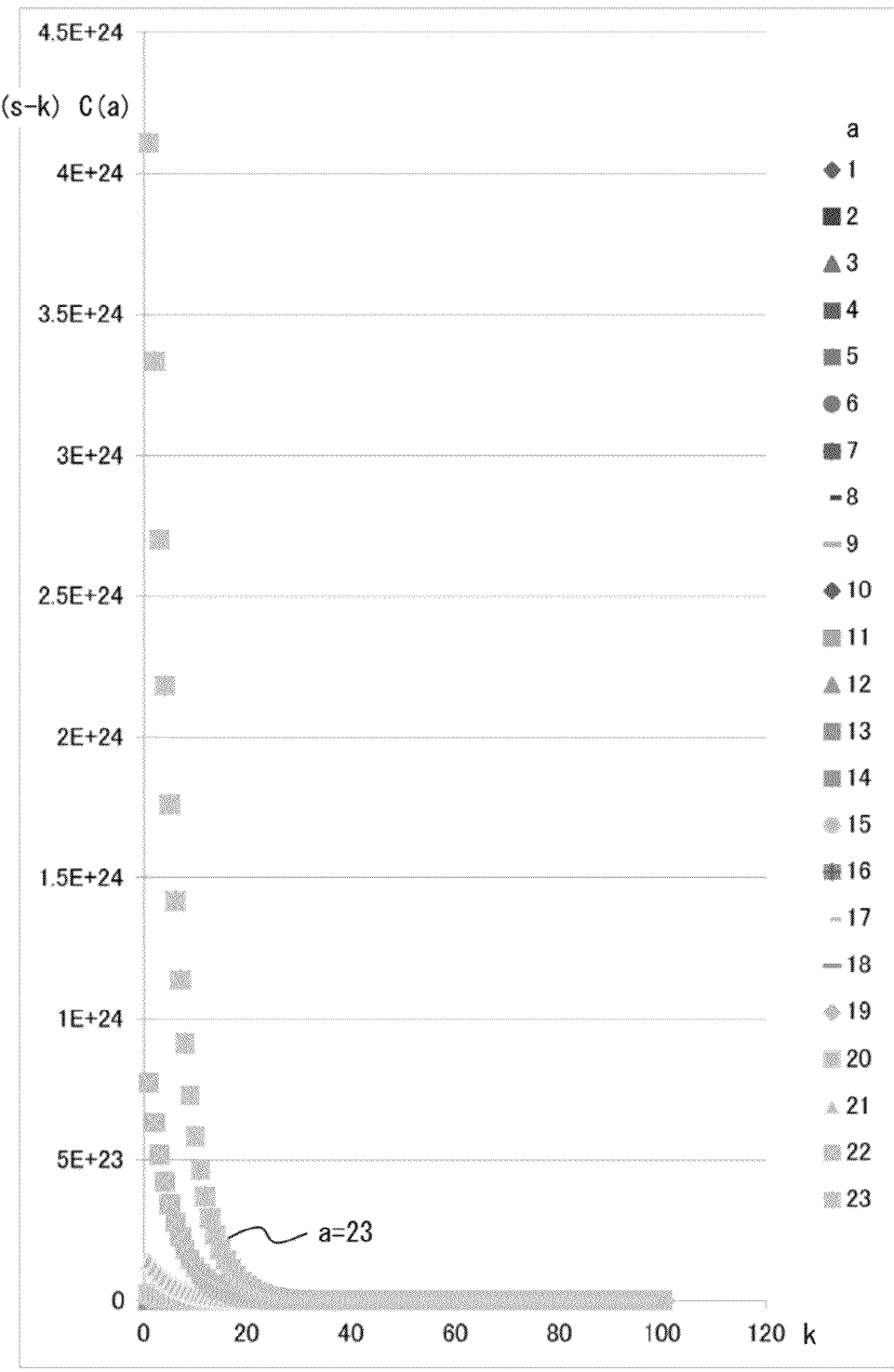
F I G. 5

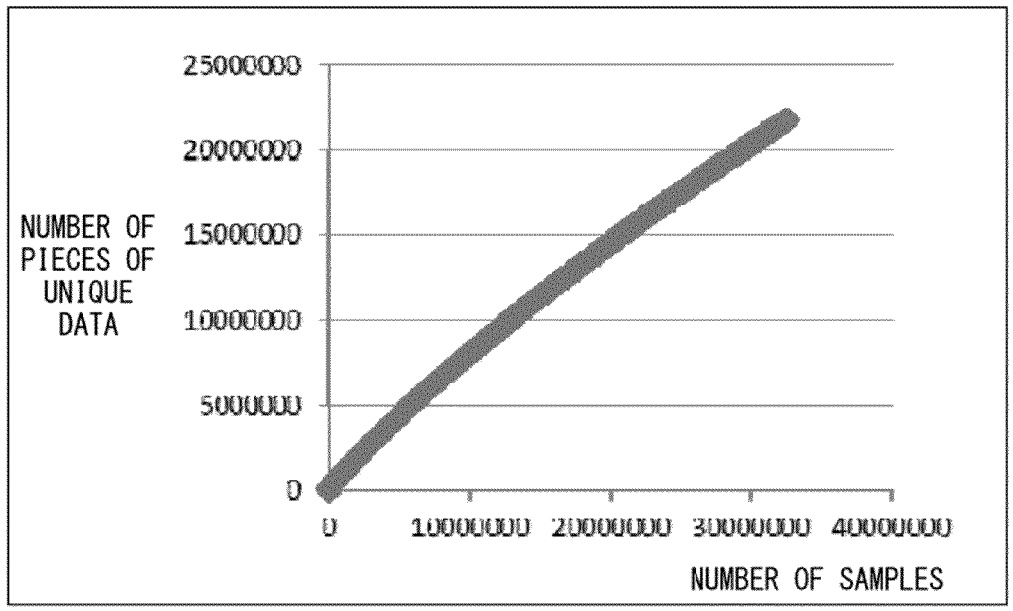
F I G. 7

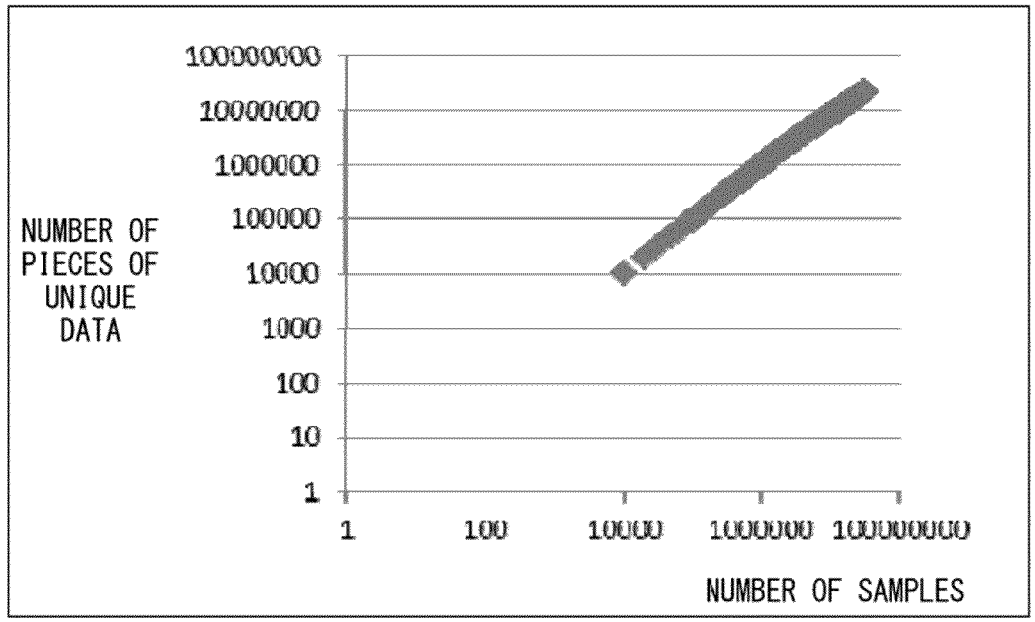
F I G. 8

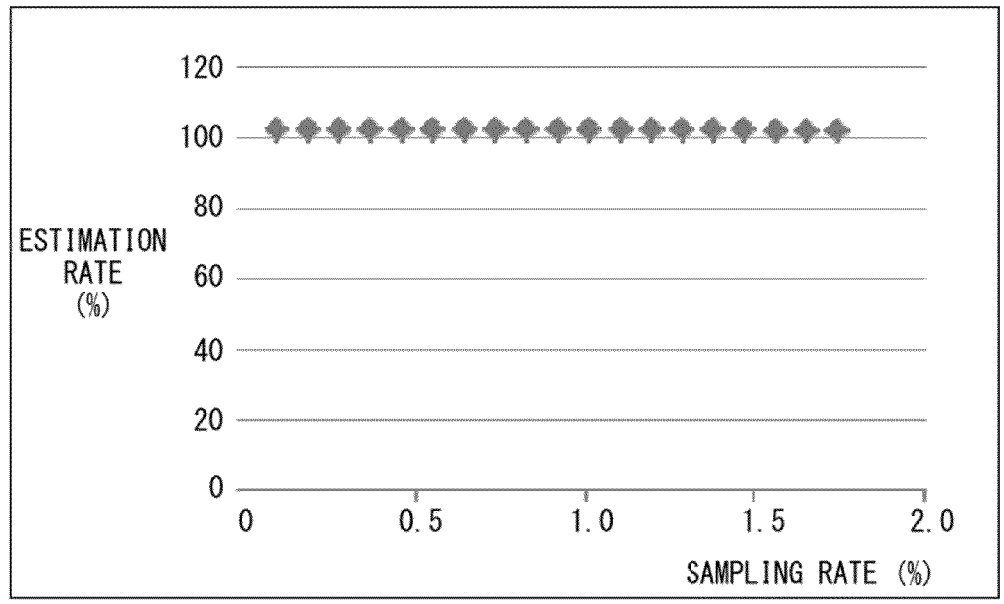
F I G. 9

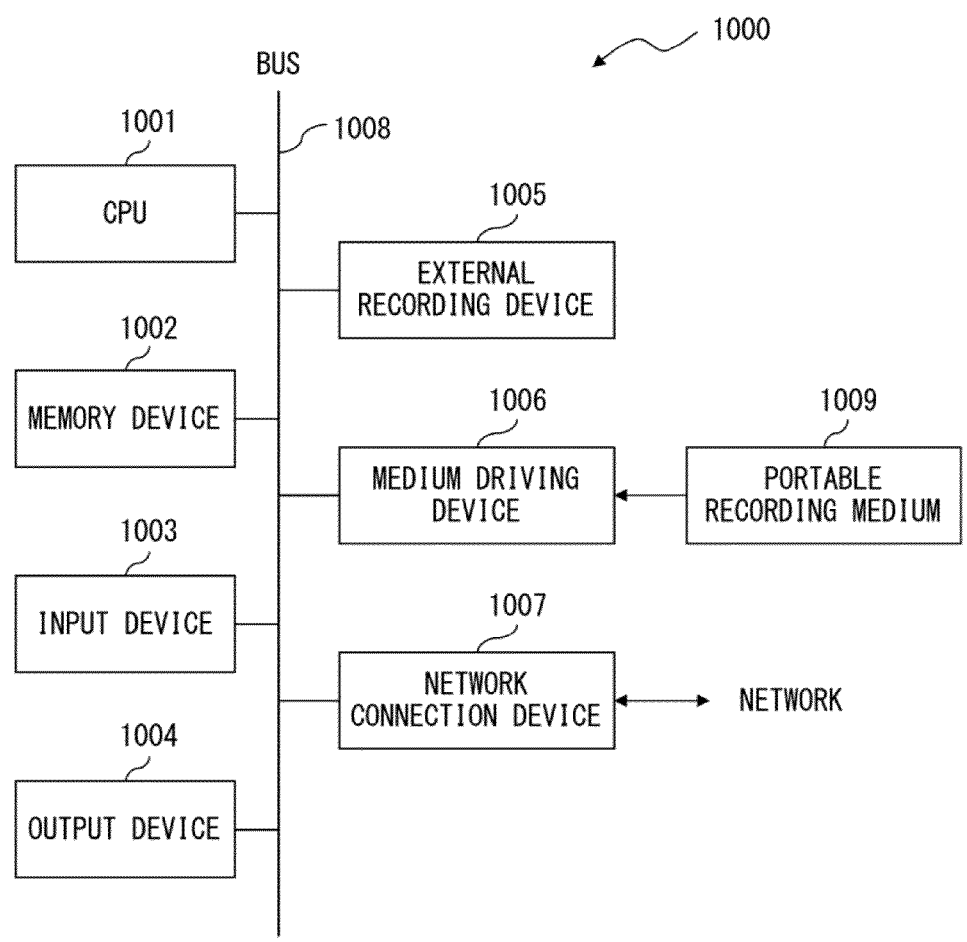
F I G. 10

DUPLICATION ELIMINATION IN A STORAGE SERVICE

CROSS-REFERENCE TO RELATED APPLICATION

This application is based upon and claims the benefit of priority of the prior Japanese Patent Application No. 2012-17032, filed on Jan. 30, 2012, the entire contents of which are incorporated herein by reference.

FIELD

The embodiments described herein are related to storage services such as an information storage service or the like provided by a service provider to users, and particularly to a technique of eliminating duplications of storage in a storage service.

BACKGROUND

Businesses that rent storage (memory regions secured on a hard disk, or the like) to clients for a price (storage business) have recently developed under the name of storage service provider (SSP). Specifically, the storage service provider side prepares storage that is associated with a server of a client (requesting processing apparatus), and the client requests a necessary volume of the storage from the storage service provider and pays a rental fee in response to the volume he or she requested.

Because clients pay fees corresponding to the storage volume, a wasteful situation where the same data is stored in duplicate is not desirable to them. A duplication elimination technique is for eliminating this kind of waste. Specifically, a duplication elimination technique is a technique by which, when data (referred to as target data hereinafter) is to be stored in storage, whether or not the same data has already been stored in that storage is detected, i.e., the data duplication is detected, and if the same data has already been stored, the target data is replaced by, for example, linking so as to put together the duplicated data into one piece of data (elimination) (See Patent Documents 1 and 2, for example). The name duplication elimination technique is also used to refer to a technique of eliminating all pieces of the same data that have already been duplicated except for one piece of that data.

A duplication elimination system using this kind of a duplication elimination technique divides information in a file or storage into prescribed units, uses a collision-safe hash value such as an encoded hash value, and performs determination of duplication by comparing the hash values. The purpose of this is to avoid duplicate recording of data, and to reduce the volume in a storage system.

This duplication elimination technique can reduce the volume of storage necessary for storing data. Effective utilization of storage such as this leads to suppression of power consumption and a use rate of an installation place.

Patent Document 1: Japanese Laid-Open Patent Publication No. 2009-80671
Patent Document 2: Japanese Laid-Open Patent Publication No. 2011-118712

SUMMARY

According to one aspect of the embodiments, a method of managing storage implemented in a storage management device that manages storage to which access for information is made by a requesting processing apparatus includes: making a data sampling unit randomly obtain a prescribed number of data units from among data units that constitute the information from the storage, making a sample duplication ratio calculation unit calculate a sample unit duplication ratio, which is a ratio at which the obtained data units duplicate each other, making an overall duplication ratio estimation unit estimate an overall data unit duplication ratio, which is a ratio at which all data units stored in the storage duplicate each other, by using a prescribed function that utilizes the calculated sample unit duplication ratio, and making an estimation result output unit output the estimated overall data unit duplication ratio to an output device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates functional blocks of a storage management device to which the present invention has been applied;

FIG. 2 illustrates the relationship between the number of sampled data units (the number of samples) and the number of pieces of unique data;

FIG. 3 is a graph in which the y axis represents $(s-k)C(a)$ and the x axis represents k in order to illustrate the relationship between them (first);

FIG. 5 is a graph in which the y axis represents $(s-k)C(a)$ and the x axis represents k in order to illustrate the relationship between them (third);

FIG. 7 illustrates the relationship between the number of pieces of unique data and the number of samples;

FIG. 8 illustrates the relationship between the number of pieces of unique data and the number of samples in the form of a double logarithmic graph;

FIG. 9 illustrates the relationship between a sampling rate and an estimation rate;

FIG. 10 illustrates a hardware configuration of a storage management device to which the present invention has been applied.

DESCRIPTION OF EMBODIMENTS

Figure 4:
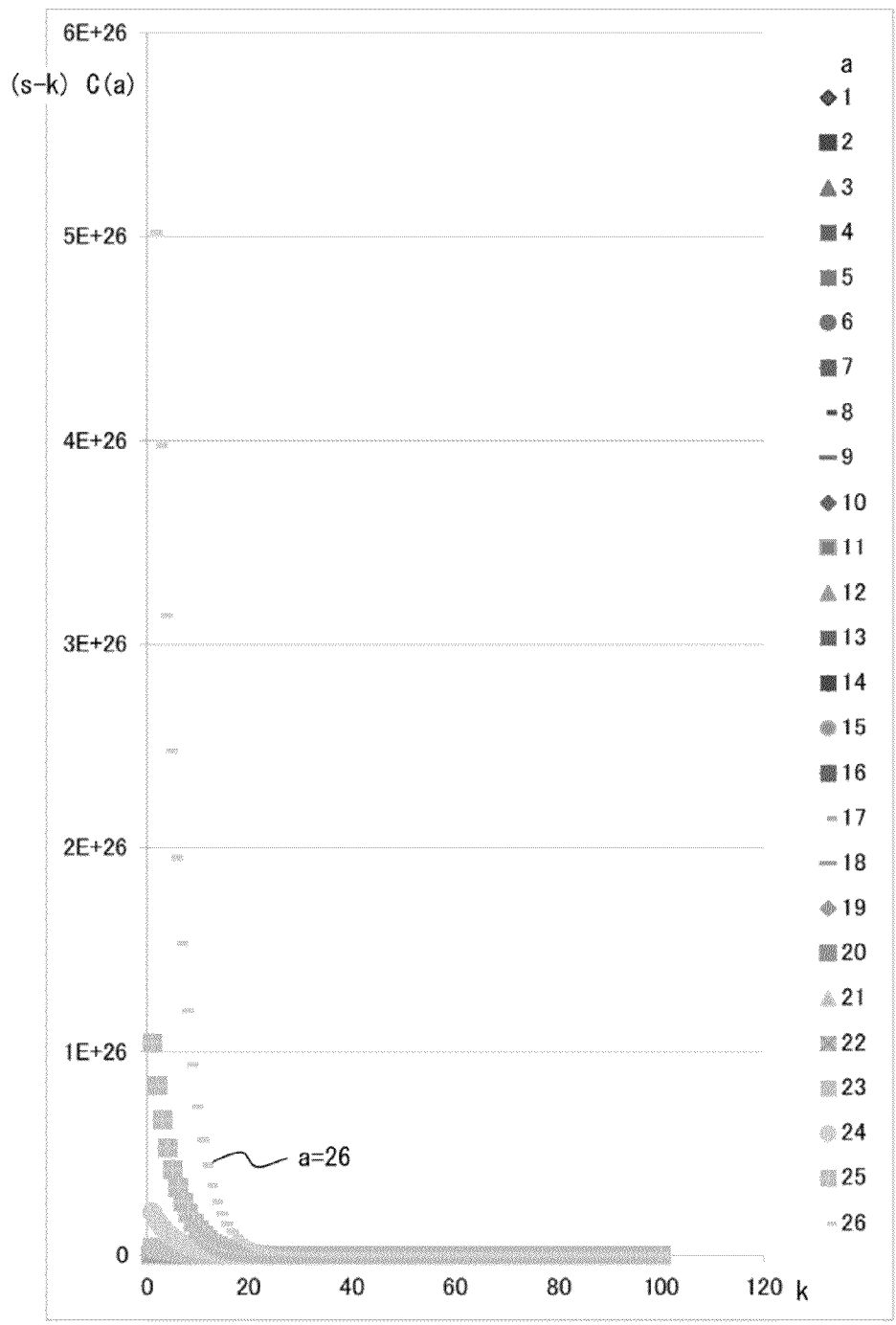
FIG. 4 is a graph in which the y axis represents $(s-k)C(a)$ and the x axis represents k in order to illustrate the relationship between them (second)

Hereinafter, the embodiments of the present invention will be explained in detail by referring to the drawings.

FIG. 1 illustrates functional blocks of a storage management device to which the present invention has been applied.

In FIG. 1, a storage management device 1 includes a sample obtainment function 11, a sample value storage function 12, a storing unit 13, a unique data determination function 14, an estimation function 15, and an output unit 16 so as to manage storage 2 to which accesses for information are made from a requesting processing apparatus as a server of a client.

The sample obtainment function 11 randomly obtains a prescribed number of data units among data units constituting the above information as samples 21 from the storage 2. The purpose of obtaining samples at random is to avoid unevenness caused by differences in positions, and the randomness is caused by, for example, randomly selecting the offsets of the storage 2 as the target.

The sample value storage function 12 stores, in the storing unit 13, the positions in the storage 2 for storing the samples 21 obtained by the sample obtainment function 11, and the data of the samples 21.

The unique data determination function 14 calculates a sample unit duplication ratio, which is a ratio at which the samples 21 obtained by the sample obtainment function 11 duplicate. A method of calculating a sample unit duplication ratio will be explained later.

The estimation function 15 uses a prescribed function based on the sample unit duplication ratio calculated by the unique data determination function 14 so as to estimate the overall data unit duplication ratio, which is the ratio at which all data units stored in the storage 2 duplicate.

Then, the output unit 16 outputs the overall data unit duplication ratio estimated by the estimation function 15.

As described above, the storage management device 1 to which the present invention has been applied focuses on the relationship between the number of the samples 21 to be obtained and the duplication ratio instead of calculating the duplication ratio of all data units, and thereby efficiently estimates the duplication ratio of all data units by sampling. Because of this, the present invention can be used as a benchmark tool for determination of whether to apply the duplication elimination of storage 2. Also, by estimating the overall data unit duplication ratio dynamically, the situation of the system can be monitored.

Also, the above sampling is repeated continuously so as to intermittently calculate the sample unit duplication ratios during the repeating. And when the number of sampling iterations has increased to a value sufficient to estimate the overall data unit duplication ratio, approximation based on a prescribed function of the number of the samples and the duplication ratio is performed so as to estimate the duplication ratio of all data units from that function.

Various functions can be used as the prescribed function described above. For example, a first function is an n-dimensional function obtained by approximating the relationship between the prescribed number of the obtained data units and the sample unit duplication ratio, an example of which is a quadratic function. Also, a function utilizing Heaps' law can be used as a second function when it is based on Zipf distribution.

Next, explanations will be given for duplication ratios.

For simplicity, data units stored in the storage 2 are expressed in the form of sets.

For example, it is assumed that a set {"A", "B", "B", "B", "C", "D", "D", "D", "D", "D"} constitutes all the data units stored in the storage 2. There are four types of data units that constitute this set.

In such a case, the total number of pieces of data is "10", and the number of pieces of unique data is "4". The ratio of the number of pieces of unique data to the total number of pieces of data is herein referred to as a unique data ratio. In the above example, the unique data ratio is "0.4(=40%)".

The duplication ratio is "0.6(=60%)", which is the result of subtracting the unique data ratio (0.4 (=40%)) from the total (1 (=100%)).

FIG. 2 illustrates the relationship between the number of sampled data units (the number of samples) and the number of pieces of unique data.

As illustrated in FIG. 2, as the number of samples increases, the number of pieces of unique data also increases. This relationship can be expressed by a prescribed function.

However, the characteristic feature of this function is that while the number of samples increases sharply where there are not so many samples (sampling region 22), the increase becomes moderate as the number of samples increases. The number of pieces of unique data in a region where all data units are sampled (final region 23) can be estimated from the relationship between the number of samples in the sampling region and the number of pieces of unique data.

Here, attention is paid to how many sampling iterations it takes to find a plurality of the same data units.

As an example, a case is assumed where balls are put in b boxes. There are no limitations on the number of balls that can be put in each box.

In such a case, probability P(k) that the first ball will be found at the k-th opening of a box when the leftmost box is opened first is expressed by equation (1) below.

$$P(k)=((b-k+1)H(a))/((b)H(a))=((b+a-k)C(a))/((b+a-1)C(a)) \quad \text{equation (1)}$$

In the above equation, H is the number of duplicated combinations, C is a binomial coefficient, and K is a constant term.

When s=b+a is satisfied, probability P(k) is expressed by equation (2) below.

$$P(k)=K(s-k)(s-1-k)\ldots(s-a+1-k) \quad \text{equation (2)}$$

P(k) above is a polynomial of k.

Also, all terms are positive in the range satisfying $1 \leq k \leq b$, and when k=b, s−a+1−k=1 is satisfied.

The relationship between (s−k)C(a) and k will be depicted in the form of a graph, where b=100 and a=1, ... 29.

FIGS. 3 through 5 are graphs in which the y axis represents (s−k)C(a) and the x axis represents k. These graphs employ different scales for the y axes.

As illustrated in FIGS. 3 through 5, the curves have a similar shape regardless of the values of "a". In regions where k is a small value, the relationship can be approximated by a straight line. Also, the increase rate is linear, and negative.

As described above, in an embodiment to which the present invention has been applied, attention is paid to how many sampling iterations it takes to find a plurality of the same data units.

As a general rule, such data units tend to be found in a smaller number of sampling iterations, and it is less likely that they will be found in the last sampling iteration.

When the number of samples is assumed to be S, and the number of pieces of unique data is U, equations (3) and (4) below are satisfied.

$$dU/dS=-a_0 \times S+a_1 \, (a_i \geq 0) \quad \text{equation (3)}$$

$$U=-a_0/2 \times S^2 + a_1 \times S + a_2 \quad \text{equation (4)}$$

Figure 6:
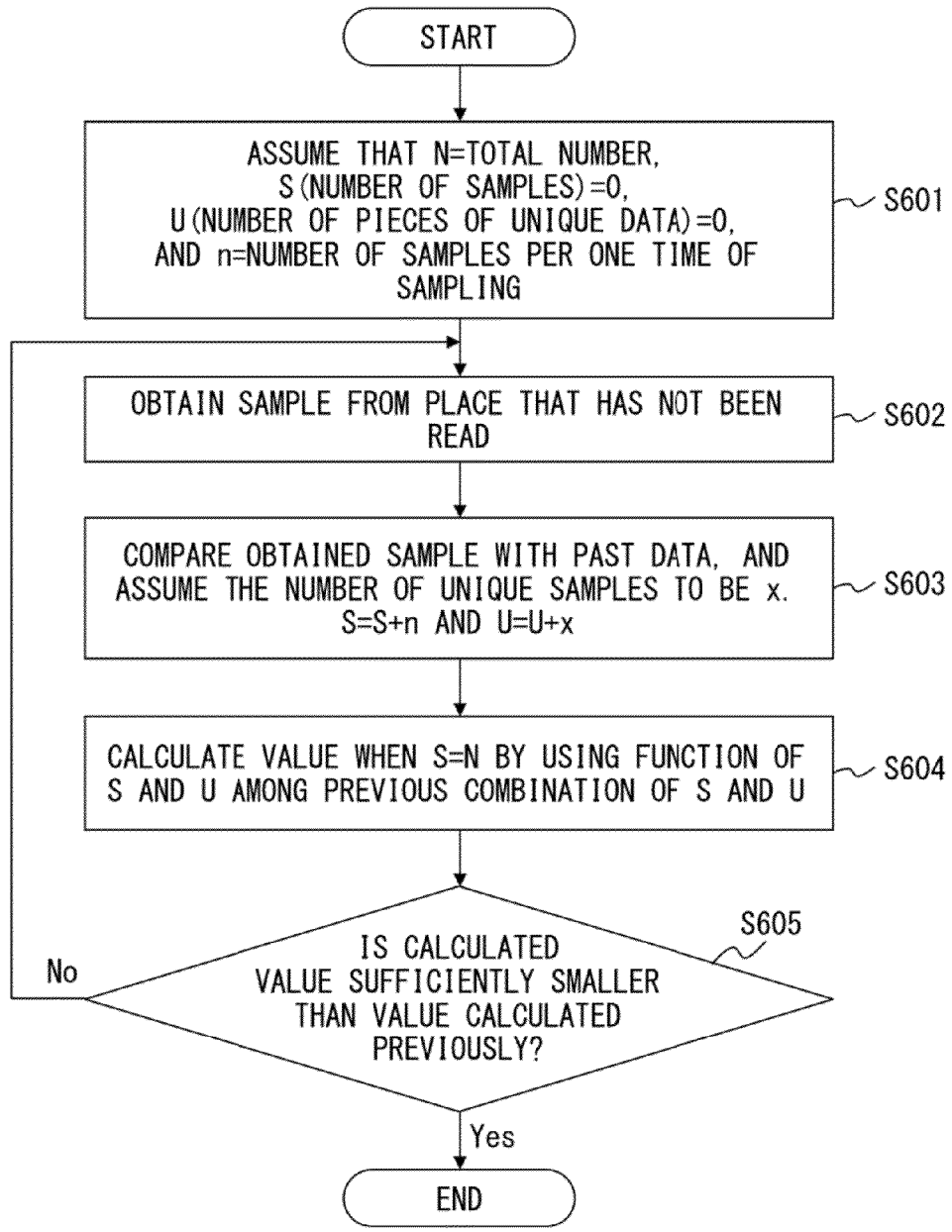
FIG. 6 is a flowchart explaining a process of managing storage to which the present invention has been applied.

FIG. 6 is a flowchart explaining a process of managing storage to which the present invention has been applied.

The method of managing storage illustrated in FIG. 6 is implemented by the storage management device 1 explained by referring to FIG. 1.

In step S601, it is assumed that the total number of blocks is N, the total number of samples is S (initial value is zero), the accumulated number of pieces of unique data is U (initial value is zero), and the number of samples obtained in one sampling iteration is n.

Steps S602 through S605 below are repeated r times, which is a sufficient number of sampling iterations.

First, in step S602, n data units that have not been obtained are obtained as new samples 21 at random from the storage 2 by referring to the memory device 13, from among data units stored in the storage 2.

In step S603, the samples 21 obtained in previous step S602 are compared with the samples 21 obtained previously in step S602, and the number of unique samples 21 is assumed to be x. Next, S+n is substituted into S, and U+x is substituted into U.

Next, in step S604, the combination of S and U is assigned to the above n-dimensional function, such as, for example, a quadratic function, and coefficients $a_0$, $a_1$, $a_2$ are obtained by using the least square approach. U when S=N is calculated, i.e., $U(N)=-a_0/2 \times N+a_1 \times N+a_2$ is calculated, and the result is handled as the estimated value of U.

In step s605, when the calculated value of U(N) is sufficiently smaller than the value calculated previously, such as being within a prescribed range, it is determined that the number of sampling iterations has reached a sufficient number (r) of sampling iterations (Yes in step S605), and this storage management process is terminated. When the compared value is not within the prescribed range (No in step s605), the process returns to step S602.

As described above, the relationship between the number of samples and the importance can be approximated by an n-dimensional function such as a quadratic function or the like. Random sampling enables the estimation of the total importance by utilizing the approximation of an n-dimensional function. This can reduce the time necessary for the process.

A method of managing storage and a storage management device to which the present invention has been applied can use other functions in place of the above n-dimensional function.

FIG. 7 illustrates the relationship between the number of pieces of unique data and the number of samples. FIG. 8 illustrates the relationship between the number of pieces of unique data and the number of samples in the form of a double logarithmic graph. FIG. 9 illustrates the relationship between the sampling rate and the estimation rate.

As illustrated in FIG. 7, as the number of samples increases, the number of pieces of unique data also increases. Also, the relationship in the logarithms between the number of pieces of unique data and the number of samples can be approximated by a straight line, as illustrated as a graph in FIG. 8.

A relationship close to this relationship is referred to as being based on Heaps' law.

As a general rule, Heaps' law can be expressed by equation (5) below.

$$M=kT^b \qquad \text{equation (5)}$$

In the above equation, M represents the number of pieces of unique data, T represents the number of samples, and k represents a prescribed constant which is preferably within a range between 10 and 100. b represents a prescribed constant preferably within a range between 0.4 through 0.6.

The double logarithm of the functions expressing this Heaps' law is expressed by equation (6) below.

$$\log(M)=b \times \log(T)+\log(k) \qquad \text{equation (6)}$$

Because this function, expressing Heaps' law, is a power function, this function is linear in a double logarithmic graph.

FIG. 10 illustrates a hardware configuration of a storage management device to which the present invention has been applied.

The storage management device illustrated in FIG. 1 can be implemented by using, for example, an information processing apparatus (computer) 1000 illustrated in FIG. 10. The information processing apparatus 1000 illustrated in FIG. 1000 includes a CPU (Central Processing Unit) 1001, a memory device 1002, an input device 1003, an output device 1004, an external recording device 1005, a medium driving device 1006, and a network connection device 1007, all of which are connected to each other through a bus 1008.

The memory device 1002 is a semiconductor memory device such as, for example, ROM (Read Only Memory), RAM (Random Access Memory), flash memory, and the like, and stores programs and data used for storage management processes. Programs stored in the memory device 1002 include a program that implements the storage management process illustrated in FIG. 6. For example, the CPU 1001 executes the program by using the memory device 1002 so as to perform the above storage management process. The memory device 1002 can also be used as the storing unit 13 illustrated in FIG. 1.

The input device 1003 is, for example, a keyboard, a pointing device, or the like, and is used for inputting instructions or information from operators. The output device 1004 is, for example, a display device, a printer, a speaker, or the like, and is used for outputting inquiries to operators or process results. The output device 1004 can also be used as the output unit 16 illustrated in FIG. 1.

The external recording device 1005 is, for example, an optical disk device, an magnetic disk device, a magneto-optical disk device, a tape device, or the like. Examples of this external recording device 1005 also include a hard disk drive. The information processing apparatus 1000 can store programs and data in this external recording device 1005 so as to load them onto the memory device 1002 to use them.

The medium driving device 1006 drives a portable recording medium 1009 so as to access information on it. The portable recording medium 1009 is, for example, a memory device, a flexible disk, an optical disk, a magneto-optical disk, or the like. Examples of this portable recording medium 1009 also include a CD-ROM (Compact Disk Read Only Memory), a DVD (Digital Versatile Disk), a USB (Universal Serial Bus), and the like. Operators can store programs and data in this portable recording medium 1009 so as to load them onto the memory device 1002 to use them.

As described above, examples of a computer-readable recording medium for storing programs and data used for storage management processes include a physical (not temporary) recording medium such as the memory device 1002, the external recording device 1005, and the portable recording medium 1009.

The network connection device 1007 is a communication interface that is connected to a wired or wireless communication network such as a LAN (Local Area Network) or the like, for performing data conversion necessary for communication. The information processing apparatus 1000 can receive programs and data from an external device via the network connection device 1007 so as to load them onto the memory device 1002 to use them. The network connection device 1007 can also be used as the output unit illustrated in FIG. 1.

Figure 11:
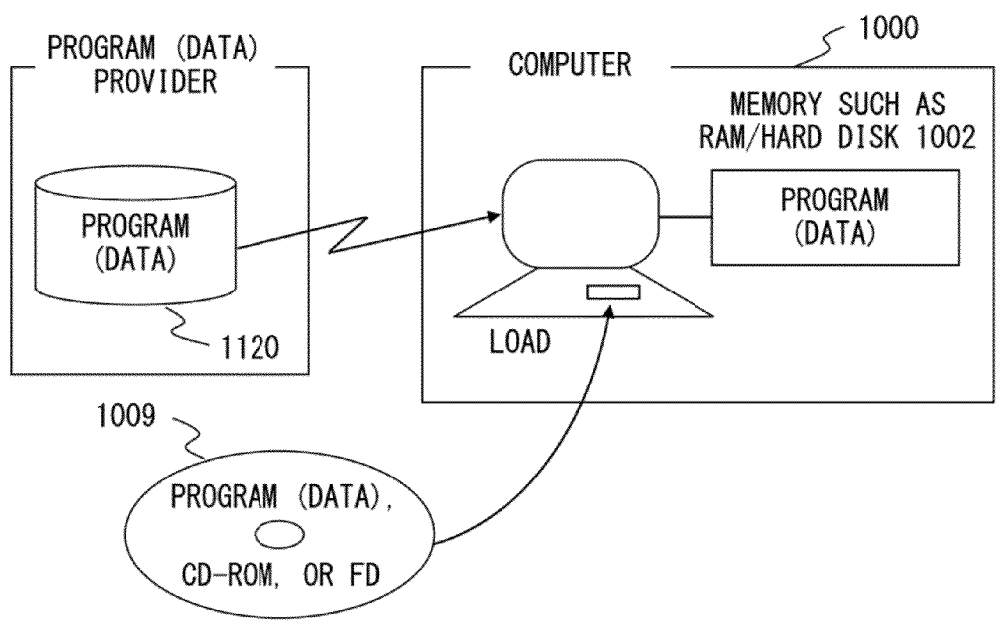
FIG. 11 illustrates a way to provide programs and data to an information processing apparatus.

FIG. 11 illustrates a method of providing programs and data to an information processing apparatus.

For example, programs and data stored in the external recording device 1005 are loaded onto the memory device 1002 of the information processing apparatus 1000. Also, an external device that can be connected via the network connection device 1007 generates a carrier signal for carrying the programs and data 1120, and transmits the signal to the information processing apparatus 1000 through an arbitrary transmission medium on the communication network.

Detailed explanations have been given for the disclosed embodiments and the advantages thereof. However, those skilled in the art are allowed to make various modifications, additions, and omissions without departing from the scope of the present invention, as clearly described in claims.

According to the present invention, it is possible to reduce processing time for predicting the amount of duplicated data or time taken to eliminate the duplication.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of managing storage implemented in a storage management device that manages storage to which access for information is made by a requesting processing apparatus, comprising:
    making a data sampling unit randomly obtain a prescribed number of data units from among data units that constitute the information from the storage;
    making a sample duplication ratio calculation unit calculate a sample unit duplication ratio, which is a ratio at which the obtained data units duplicate each other;
    making an overall duplication ratio estimation unit estimate an overall data unit duplication ratio, which is a ratio at which all data units stored in the storage duplicate each other, by using a prescribed function that utilizes the calculated sample unit duplication ratio; and
    making an estimation result output unit output the estimated overall data unit duplication ratio to an output device.

2. The method of managing storage according to claim 1, wherein:
    the prescribed function is a function that expresses a relationship between the prescribed number of obtained data units and the sample unit duplication ratio in a form of an n-dimensional function.

3. The method of managing storage according to claim 1, wherein:
    the prescribed function is a function utilizing Heaps' law.

4. A storage management device that manages storage to which access for information is made by a requesting processing apparatus, comprising:
    a data sampling unit that randomly obtains a prescribed number of data units from among data units that constitute the information from the storage;
    a sample duplication ratio calculation unit that calculates a sample unit duplication ratio, which is a ratio at which the obtained data units duplicate each other;
    an overall duplication ratio estimation unit that estimates an overall data unit duplication ratio, which is a ratio at which all data units stored in the storage duplicate each other, by using a prescribed function that utilizes the calculated sample unit duplication ratio; and
    an estimation result output unit that outputs the estimated overall data unit duplication ratio to an output device.

* * * * *